United States Patent
Kim

(10) Patent No.: US 10,651,729 B2
(45) Date of Patent: May 12, 2020

(54) APPARATUS FOR CONTROLLING SOLAR LIGHT VOLTAGE

(71) Applicant: LSIS CO., LTD., Gyeonggi-do (KR)

(72) Inventor: Ho-Yeol Kim, Gyeonggi-do (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 455 days.

(21) Appl. No.: 15/483,945

(22) Filed: Apr. 10, 2017

(65) Prior Publication Data
US 2017/0302163 A1    Oct. 19, 2017

(30) Foreign Application Priority Data

Apr. 15, 2016 (KR) .................. 10-2016-0046485

(51) Int. Cl.
| | |
|---|---|
| H02M 1/44 | (2007.01) |
| H02M 7/42 | (2006.01) |
| H02S 40/30 | (2014.01) |
| H02J 3/38 | (2006.01) |
| H02M 1/32 | (2007.01) |

(52) U.S. Cl.
CPC .............. *H02M 1/44* (2013.01); *H02J 3/383* (2013.01); *H02M 1/32* (2013.01); *H02M 7/42* (2013.01); *H02S 40/30* (2014.12); *H02M 2001/322* (2013.01); *Y02E 10/563* (2013.01)

(58) Field of Classification Search
CPC ............ H02J 3/383; H02M 1/32; H02M 1/44; H02M 7/42; H02M 2001/322; H02S 40/30; Y02E 10/563
USPC ........ 307/42, 80–83; 363/48, 51, 79, 43, 95; 323/207–210
See application file for complete search history.

(56) References Cited

U.S. PATENT DOCUMENTS

| | | | |
|---|---|---|---|
| 3,214,640 A * | 10/1965 | Mills ................... | H02H 1/0007 361/92 |
| 9,083,233 B2 * | 7/2015 | Smith ................... | H02M 1/126 |
| 2011/0249475 A1 | 10/2011 | Fujii et al. | |

(Continued)

FOREIGN PATENT DOCUMENTS

| | | |
|---|---|---|
| CN | 102214929 A | 10/2011 |
| CN | 203086366 U | 7/2013 |
| CN | 204046188 U | 12/2014 |

(Continued)

OTHER PUBLICATIONS

Extended European Search Report dated Jun. 6, 2017 corresponding to application No. 16204128.9-1804.

(Continued)

*Primary Examiner* — Rexford N Barnie
*Assistant Examiner* — Toan T Vu
(74) *Attorney, Agent, or Firm* — K&L Gates LLP

(57) ABSTRACT

The present invention relates to an apparatus for controlling a solar light voltage, which is capable of decreasing an output stage voltage of an AC EMC filter by connecting a load to an output stage of the AC EMC filter. The apparatus includes: a DC filter configured to receive a DC voltage from a DC solar module and reduce a noise of the DC voltage; an inverter configured to convert the DC voltage with the reduced noise into an AC voltage; and an AC filter configured to reduce a noise of the AC voltage and output the AC voltage with the reduced noise to a power system through an output stage.

6 Claims, 3 Drawing Sheets

(56) References Cited

U.S. PATENT DOCUMENTS

| | | | |
|---|---|---|---|
| 2013/0070490 A1* | 3/2013 | Liu | H02M 1/12 363/40 |
| 2015/0333507 A1 | 11/2015 | Petrovic et al. | |

FOREIGN PATENT DOCUMENTS

| | | |
|---|---|---|
| JP | S60-261369 A | 12/1985 |
| JP | H9215205 A | 8/1997 |
| JP | 2001186664 A | 7/2001 |
| JP | 2004254447 A | 9/2004 |
| JP | 2004350420 A | 12/2004 |
| JP | 2008-154408 A | 7/2008 |
| JP | 2009247185 A | 10/2009 |
| JP | 2010213439 A | 9/2010 |
| JP | 2013027207 A | 2/2013 |
| JP | 2014-217140 A | 11/2014 |
| JP | 2016046948 A | 4/2016 |
| KR | 10-2006-0054734 A | 5/2006 |
| KR | 10-2012-0077940 A | 7/2012 |
| WO | 2010032300 A1 | 3/2010 |

OTHER PUBLICATIONS

Japanese Office Action dated May 16, 2017 corresponding to application No. 2016-248432.

* cited by examiner

APPARATUS FOR CONTROLLING SOLAR LIGHT VOLTAGE

CROSS REFERENCE TO RELATED APPLICATION

This application claims the benefit of Korean Patent Application No. 10-2016-0046485, filed on Apr. 15, 2016, entitled "APPARATUS FOR CONTROLLING SOLAR LIGHT VOLTAGE", which is hereby incorporated by reference in its entirety into this application.

BACKGROUND

1. Technical Field

The present invention relates to an apparatus for controlling a solar light voltage and more particularly, to an apparatus for controlling a solar light voltage, which is capable of decreasing an output stage voltage of an AC EMC filter by connecting a load to an output stage of the AC EMC filter.

2. Description of the Related Art

In recent years, in order to solve problems such as environmental pollution and so on, eco-friendly renewable energy technologies have been actively developed to replace conventional fossil fuels. Among these, a solar power system is in the spotlight since it can generate power as much as needed in necessary places without causing any pollution and is easy in terms of maintenance.

Such a solar power system uses a variety of kinds of monitoring sensors to collect monitoring data on surrounding environments such as solar radiation, phase angle, wind, rain, and so on. Such monitoring data are important considerations in the operation of the solar power system, such as power generation quantity, load, storage, and so on of the solar power system.

In addition, the solar power system may use a solar light voltage controlling apparatus (or solar power control unit (PCU)) to convert sunlight into electrical energy directly using a solar module, such as a solar cell or a solar battery, without the aid of a power generator.

The solar light voltage controlling apparatus is an apparatus which receives electrical energy in the form of DC power from a solar module and converts the electrical energy into AC power to be supplied to a consumer. When the solar light voltage controlling apparatus supplies the electrical energy obtained thus, consumers such as houses or factories use AC power.

However, such a conventional solar light voltage controlling apparatus has a problem that it is not possible to determine whether or not abnormality occurs in an inverter or a power system since a voltage value of the inverter or the power system cannot be measured. In addition, when power is interrupted between the inverter and the power system, the conventional solar light voltage controlling apparatus has another problem that the inverter or the power system cannot be protected since a voltage value of an output stage cannot be decreased. In addition, the conventional solar light voltage controlling apparatus has another problem that there is a high danger of electric shock since a voltage value of an output stage cannot be decreased.

SUMMARY

It is an aspect of the present invention to provide an apparatus for controlling a solar light voltage, which is capable of protecting an inverter or a power system by decreasing an output stage voltage of an AC EMC filter by connecting a load to an output stage of the AC EMC filter.

It is another aspect of the present invention to provide an apparatus for controlling a solar light voltage, which is capable of reducing a danger of electrical shock by decreasing an output stage voltage of an AC EMC filter by connecting a load to an output stage of the AC EMC filter.

It is another aspect of the present invention to provide an apparatus for controlling a solar light voltage, which is capable of adjusting a time constant of an output stage by adjusting the size of a load or the capacitance of a capacitor.

It is another aspect of the present invention to provide an apparatus for controlling a solar voltage, which is capable of determining whether or not an inverter or a power system is normal based on a voltage value of an inverter or a voltage value of a power system.

The present invention is not limited to the above aspect and other aspects of the present invention will be clearly understood by those skilled in the art from the following description. The above and/or other aspects and advantages of the present invention will become apparent and more readily appreciated from the following description of the embodiments, taken in conjunction with the accompanying drawings. It should be understood that the objects and advantages of the present invention can be realized by features and combinations thereof set forth in the claims.

In accordance with one aspect of the present invention, an apparatus for controlling a solar light voltage, includes: a DC filter configured to receive a DC voltage from a DC solar module and reduce a noise of the DC voltage; an inverter configured to convert the DC voltage with the reduced noise into an AC voltage; and an AC filter configured to reduce a noise of the AC voltage and output the AC voltage with the reduced noise to a power system through an output stage. The AC filter includes: a determination unit which determines whether or not the inverter or the power system is normal based on a voltage value of the inverter or a voltage value of the power system; and one or more loads connected to the output stage.

Advantages of the Invention

According to the present invention, it is possible to protect an inverter or a power system by decreasing an output stage voltage of an AC EMC filter by connecting a load to an output stage of the AC EMC filter.

According to the present invention, it is possible to reduce a danger of electrical shock by decreasing an output stage voltage of an AC EMC filter by connecting a load to an output stage of the AC EMC filter.

According to the present invention, it is possible to adjust a time constant of an output stage by adjusting the size of a load or the capacitance of a capacitor.

According to the present invention, it is possible to determine whether or not an inverter or a power system is normal based on a voltage value of an inverter or a voltage value of a power system.

DETAILED DESCRIPTION

Figure 1:
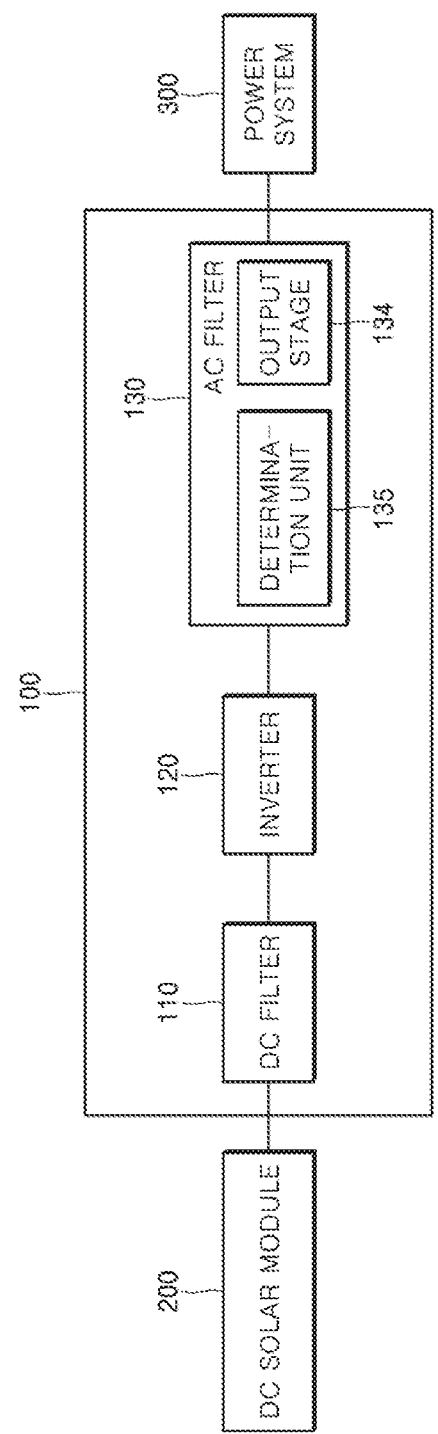
FIG. 1 is a view illustrating a solar light voltage controlling apparatus according to one embodiment of the present invention, along with a DC solar module and a power system connected to the apparatus.

The above objects, features and advantages will become more clearly apparent from the following detailed description in conjunction with the accompanying drawings. Therefore, the technical ideas of the present invention can be easily understood and practiced by those skilled in the art. In the following detailed description of the present invention, concrete description on related functions or constructions will be omitted if it is deemed that the functions and/or constructions may unnecessarily obscure the gist of the present invention. Hereinafter, preferred embodiments of the present invention will be described in detail with reference to the accompanying drawings. Throughout the drawings, the same or similar elements are denoted by the same reference numerals.

FIG. 1 is a view illustrating a solar light voltage controlling apparatus 100 according to one embodiment of the present invention, along with a DC solar module 200 and a power system 300 connected to the apparatus 100. Referring to FIG. 1, the solar light voltage controlling apparatus 100 according to one embodiment of the present invention may include a DC filter 110, an inverter 120 and an AC filter 130. The solar light voltage controlling apparatus 100 illustrated in FIG. 1 according to one embodiment is not limited in its elements to those shown in FIG. 1 but some elements may be added, changed or deleted as necessary.

Figure 2:
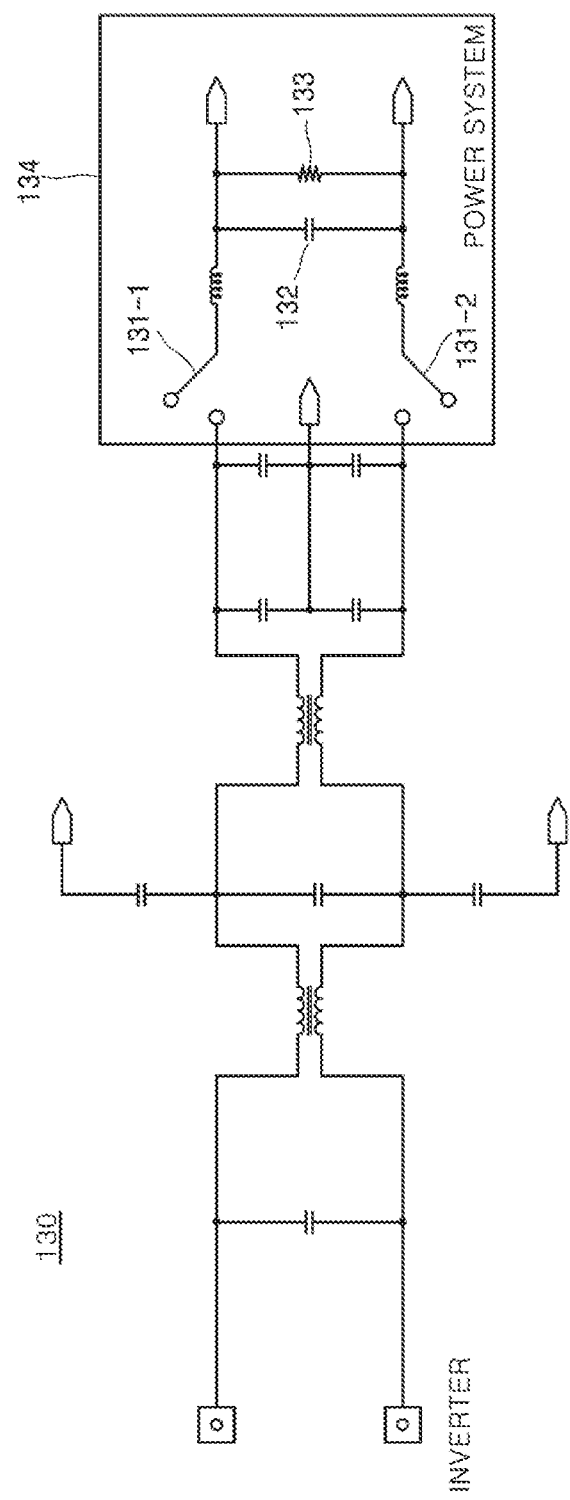
FIG. 2 is a view illustrating an AC filter according to one embodiment of the present invention.
Figure 3:
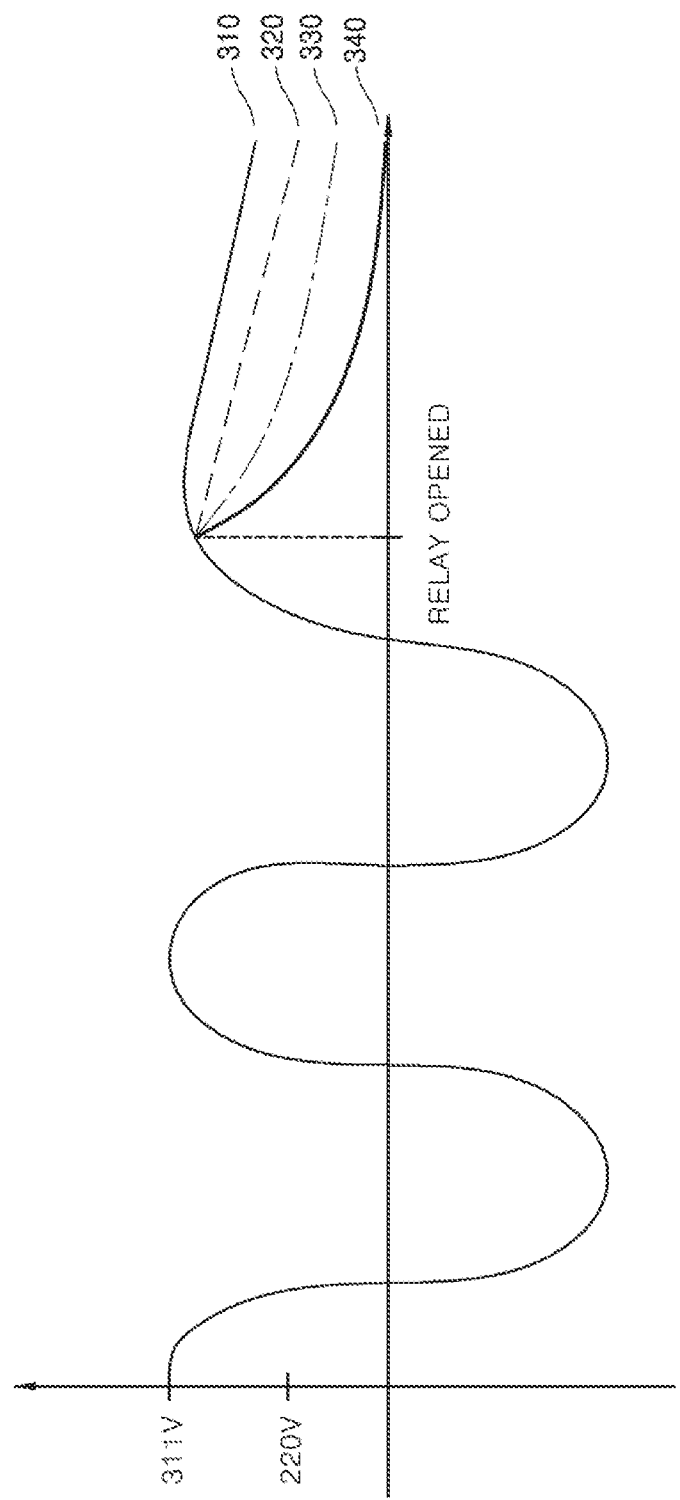
FIG. 3 is a graph showing an output stage voltage according to one embodiment of the present invention.

FIG. 2 is a view illustrating the AC filter 130 according to one embodiment of the present invention and FIG. 3 is a graph showing a voltage of an output stage 134 according to one embodiment of the present invention. Hereinafter, the solar light voltage controlling apparatus 100 will be described in detail with reference to FIGS. 1 to 3.

The DC filter 100 can reduce a noise of a DC voltage received from the DC solar module 200. The DC solar module 200 is a device for converting sunlight into DC power. Illustratively, the DC filter 100 may be a DC EMC filter. The DC filter 110 may include one or more inductors and capacitors to reduce a noise. In this case, a capacitor of the DC filter 110 may receive an AC voltage and convert the AC voltage into a DC voltage.

The inverter 120 can convert the DC voltage with the reduced noise into an AC voltage. The operation principle of the inverter 120 is to obtain an AC voltage by turning on/off a switch to connect/disconnect a DC voltage. The inverter 120 may be classified into a single phase inverter, a three phase inverter, a PWM inverter 120 and so on depending on such a DC connection/disconnection operation and an operation mechanism. The inverter 120 according to one embodiment of the present invention may be one of the above-mentioned inverters.

The AC filter 130 can reduce a noise of an AC voltage and output the AC voltage with the reduced noise to the power system 300 through the output stage 134. The power system 300 may be a power generator or a substation or may be a collection of an electric meter, appliances and so on in a house.

The AC filter 130 may further include a determination unit 135 for determining whether or not the inverter 120 or the power system 300 is normal based on a voltage value of the inverter 120 or a voltage value of the power system 300.

If the voltage value of the inverter 120 or the voltage value of the power system 300 is equal to or lower than a first set value, the determination unit 135 may determine that the inverter 120 or the power system 300 is in a power outage state. On the other hand, if the voltage value of the inverter 120 or the voltage value of the power system 300 is equal to or higher than a second set value, the determination unit 135 may determine that the inverter 120 or the power system 300 is in an overvoltage state. The first set value and the second set value may be set by a user or may be automatically set in the determination unit 135.

In the meantime, the AC filter 130 may include relays 131-1 and 131-2 for interrupting power between the inverter 120 and the power system 300. If the determination unit 135 determines that abnormality occurs in the inverter 120 or the power system 300, the relays 131-1 and 131-2 can interrupt power between the inverter 120 and the power system 300.

Each of the relays 131-1 and 131-2 is a device which is operated to open/close other circuits when its input reaches a specified value. Illustratively, each of the relays 131-1 and 131-2 may be a contact relay, a thermal relay, a pressure relay, an optical relay or the like. Each of the relays 131-1 and 131-2 shown in FIG. 2 may be one of the above-mentioned relays. If the determination unit 135 determines that the inverter 120 or the power system 135 is in the power outage state or the overvoltage state, the relays 131-1 and 131-2 can be opened.

In one embodiment, when the relays 131-1 and 131-2 are opened, the inverter 120 and the power system 300 are disconnected from each other and the voltage of the output stage 134 should be decreased within 0.5 second.

After the relays 131-1 and 131-2 are opened, if the voltage of the output stage 134 is not decreased, protection regulations cannot be met, which may result in increased danger of electric shock.

In addition, the AC filter 130 may further include a capacitor 132 for reducing a noise of an AC voltage. Since the capacitor 132 is connected to the output stage 134, even when the relays 131-1 and 131-2 are opened, a voltage across the capacitor 132 can be applied to the output stage 134. Therefore, it is necessary to discharge the voltage across the capacitor 132. To this end, in one embodiment, one or more loads 133 may be connected to the output stage 134 of the AC filter 130 in order to discharge the voltage across the capacitor 132.

At this time, the AC filter 130 can adjust the size of the load 133 such that a voltage of the output stage 134 becomes equal to or lower than a predetermined voltage value within a preset time. In addition, the AC filter 130 can adjust the size of the load 133 to decrease a time constant of the output stage 134 in order to increase a time-per-voltage drop value of the output stage 134. The time-per-voltage drop value refers to a rate of decrease of the voltage of the output stage 134 and means a slope of a graph 310, 320, 330 and 340 in FIG. 3.

In general, in an electric circuit, when an input signal is varied, an output signal is also varied and has a constant value after a certain period of time. A state where the output signal has the constant value is referred to as a steady state and a time constant refers to a time taken for the output signal to reach 63.2% of the steady state. The time constant is proportional to capacitance and resistance in an RC circuit. A larger time constant provides a larger time-per-voltage drop value.

Referring to FIG. 3, a graph 310 shows a decrease in voltage when the load 133 is not connected and each of graphs 320, 330 and 340 shows a decrease in voltage when the load 133 is connected. From the graph 320 to the graph 340, the resistance of the connected load 133 becomes small and the time constant becomes accordingly small. As a result, from the graph 320 to the graph 340, a voltage is decreased with a larger width. This may be summarized with the following equation 1.

$$\tau = R \times C \qquad [\text{Eq. 1}]$$
$$V = e^{-\frac{1}{\tau} \times t}$$

Where, R is the resistance of the load 133, C is the capacitance of the capacitor 132, τ is a time constant and V is the voltage of the output stage 134.

The AC filter 130 may include one or more capacitors for reducing a noise of an AC voltage. The capacitor may have capacitance smaller than a preset value. When the capacitance is smaller than the preset value, the time constant is decreased and the time-per-voltage drop value of the output stage 134 is accordingly increased, as described above.

In addition, the capacitor may be used to smooth the AC voltage. Smoothing is an operation to weaken or remove a noise or a discontinuous section in data in order to smooth the data. The solar light voltage controlling apparatus 100 according to one embodiment of the present invention can increase voltage transfer efficiency.

As described above, according to the present invention, it is possible to protect an inverter or a power system by decreasing an output stage voltage of an AC EMC filter by connecting a load to an output stage of the AC EMC filter. In addition, it is possible to reduce a danger of electrical shock by decreasing an output stage voltage of an AC EMC filter by connecting a load to an output stage of the AC EMC filter. In addition, it is possible to adjust a time constant of an output stage by adjusting the size of a load or the capacitance of a capacitor. In addition, it is possible to determine whether or not an inverter or a power system is normal based on a voltage value of an inverter or a voltage value of a power system.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An apparatus for controlling a solar light voltage, which directly converts sunlight into electrical energy, comprising:
   a DC filter configured to receive a DC voltage from a DC solar module and reduce a noise of the DC voltage;
   an inverter configured to convert the DC voltage with the reduced noise into an AC voltage; and
   an AC filter configured to reduce a noise of the AC voltage and output the AC voltage with the reduced noise to a power system through an output stage,
   wherein the AC filter includes:
      a determination unit which determines whether or not the inverter or the power system is normal based on a voltage value of the inverter or a voltage value of the power system,
      wherein the output stage is configured to include:
         a capacitor configured to connect in parallel with the power system between the inverter and the power system;
         relays configured to interrupt a connection between the inverter and the capacitor; and
         one or more loads configured to connect in parallel with the capacitor, and
         wherein the AC filter is further configured to discharge a voltage of the capacitor by adjusting resistance of the one or more loads when the inverter and the capacitor are disconnected by the relays, thereby discharging the voltage.

2. The apparatus according to claim 1, wherein the AC filter adjusts a resistance of the load such that the voltage of the output stage becomes equal to or lower than a predetermined voltage value within a preset time.

3. The apparatus according to claim 1, wherein the AC filter adjusts the resistance of the load to decrease a time constant of the output stage in order to increase a time-per-voltage value of the output stage.

4. The apparatus according to claim 1, wherein the AC filter further includes a relay which interrupts power between the inverter and the power system when the determination unit determines that abnormality occurs in the inverter or the power system.

5. The apparatus according to claim 1, wherein the AC filter includes one or more capacitors which reduce the noise of the AC voltage.

6. The apparatus according to claim 5, wherein the capacitance of the one or more capacitors is equal to or lower than a preset value.

* * * * *